(12) United States Patent
Yagi et al.

(10) Patent No.: US 10,495,734 B2
(45) Date of Patent: Dec. 3, 2019

(54) POSITION LOCATING INSTRUMENT

(71) Applicant: NTT ADVANCED TECHNOLOGY CORPORATION, Kanagawa (JP)

(72) Inventors: Shogo Yagi, Naka (JP); Fumio Saito, Tochigi (JP); Kazunori Naganuma, Kokubunji (JP); Eiichi Sugai, Ebina (JP); Tohru Kodaira, Tokyo (JP); Akira Sawaguchi, Tokyo (JP); Hideki Hagino, Inba-gun (JP); Takeshi Watanabe, Koshigaya (JP); Noriyuki Ishidu, Noda (JP); Hiizu Takemura, Kyotanabe (JP)

(73) Assignee: NTT ADVANCED TECHNOLOGY CORPORATION, Kanagawa (JP)

( * ) Notice: Subject to any disclaimer, the term of this patent is extended or adjusted under 35 U.S.C. 154(b) by 307 days.

(21) Appl. No.: 15/513,632

(22) PCT Filed: Jan. 6, 2016

(86) PCT No.: PCT/JP2016/000035
§ 371 (c)(1),
(2) Date: Mar. 23, 2017

(87) PCT Pub. No.: WO2016/111245
PCT Pub. Date: Jul. 14, 2016

(65) Prior Publication Data
US 2017/0299698 A1    Oct. 19, 2017

(30) Foreign Application Priority Data
Jan. 6, 2015    (JP) ................................ 2015-001062

(51) Int. Cl.
*G01S 7/48* (2006.01)
*G01S 7/481* (2006.01)
(Continued)

(52) U.S. Cl.
CPC .......... *G01S 7/4814* (2013.01); *G01C 15/002* (2013.01); *G01S 17/10* (2013.01);
(Continued)

(58) Field of Classification Search
CPC .............. G01C 15/00; G01S 5/00; G01S 5/16
See application file for complete search history.

(56) References Cited

U.S. PATENT DOCUMENTS

| 5,675,407 A | 10/1997 | Geng |
| 5,757,504 A | 5/1998 | Yamaguchi |

(Continued)

FOREIGN PATENT DOCUMENTS

| JP | H10-170239 A | 6/1998 |
| JP | 2002-90142 A | 3/2002 |

(Continued)

OTHER PUBLICATIONS

Extended European Search Report dated Aug. 24, 2018, issued in EP Application No. 16734986.9.

(Continued)

*Primary Examiner* — Luke D Ratcliffe
(74) *Attorney, Agent, or Firm* — Workman Nydegger

(57) ABSTRACT

Provided is a position locating instrument for a position locating method in which position locating instruments that transmit and receive light beams are arranged in series connection. The position locating instruments reduce error factors and improve measurement accuracy by providing all or some of necessary position and attitude parameters. The position locating instrument has at least one light emission port through which light from a wavelength-changeable light source is emitted; and at least one light receiving port that receives light emitted or reflected by an adjacent position locating instrument. The light emitted from the light emission port has a fanlike pattern and has an emission angle (Continued)

varying, as a monotonic function of a wavelength of the light, in a direction perpendicular to a direction in which the light spreads in the fanlike pattern.

6 Claims, 22 Drawing Sheets

(51) Int. Cl.
    *G01S 17/10*      (2006.01)
    *G01S 17/36*      (2006.01)
    *G01C 15/00*      (2006.01)
    *G01C 3/08*      (2006.01)
    *G01C 7/06*      (2006.01)

(52) U.S. Cl.
    CPC ............... *G01S 17/36* (2013.01); *G01C 3/08* (2013.01); *G01C 7/06* (2013.01)

(56) References Cited

U.S. PATENT DOCUMENTS

| | | | | |
|---|---|---|---|---|
| 6,147,760 | A * | 11/2000 | Geng | G01B 11/2509 356/3.01 |
| 2002/0060788 | A1 * | 5/2002 | Ohtomo | G01C 15/002 356/139.1 |
| 2010/0302557 | A1 | 12/2010 | Petschko et al. | |
| 2012/0105824 | A1 * | 5/2012 | Ohtomo | G01C 15/002 356/5.01 |
| 2012/0327390 | A1 | 12/2012 | Bridges | |

FOREIGN PATENT DOCUMENTS

| | | |
|---|---|---|
| JP | 2004-15476 A | 1/2004 |
| JP | 2005-172586 A | 6/2005 |
| JP | 2012-14148 A | 1/2012 |

OTHER PUBLICATIONS

Kunihiro Maeda, *New Technique for Measuring Curve Positions—Prism—*, Gekkan Suishin Gijutsu, vol. 18, No. 6, 2004, pp. 10-15. Partial translation.

International Search Report dated Apr. 11, 2016, issued in PCT Application No. PCT/JP2016/000035, filed Jan. 6, 2016.

Office Action dated Jul. 25, 2012, received in Japanese Application No. 2016-568363.

International Preliminary Report on Patentability dated Jul. 20, 2017, issued in PCT Application No. PCT/JP2016/000035, filed Jan. 6, 2016.

\* cited by examiner

POSITION LOCATING INSTRUMENT

TECHNICAL FIELD

The present invention relates to a position locating instrument and more specifically to a position locating instrument used for position-locating a curved path, such as position-locating the path of a tunnel in tunnel construction.

BACKGROUND ART

Conventionally, the path of a tunnel in tunnel construction is surveyed in the following manner using a position locating instrument. First, a collimated light beam from a laser source of a master device placed on a shaft at the entrance of a tunnel is applied to an intermediate prism unit of a slave device placed inside the tunnel. The intermediate prism unit of the slave device has two wedge prisms installed therein. The position locating instrument changes the vertical and horizontal travel directions of the light beam from the master device by appropriately rotating the two wedge prisms of the intermediate prism unit, and thereby applies the light beam to an intermediate prism unit of the next slave device. Whether the light is applied to the intermediate prism unit can be determine d by measurement of a signal from a photodetector installed near the paired wedge prisms through which light should pass.

Multiple slave devices are arranged in a line inside the tunnel, and the light beam travels along the curved path of the tunnel by being deflected sequentially by the intermediate prism units of the slave devices, and reaches the slave device located at a final target point, which is the head of the tunnel. Hereinafter, for the illustrative convenience, a side close to the master device is called an upper side, and a side away from the master device is called a lower side. After the light beam reaches the slave device at the lowermost side, the path of the tunnel can be obtained based on the angles of rotation of the paired wedge prisms of the intermediate prism units of all the slave devices.

This position locating method in which the slave devices arranged in a line in a tunnel emit and receive a light beam along the tunnel needs to find six parameters: the position of a lower-side slave device relative to the master device (a vertical angle, a horizontal angle, and the distance between the slave devices) and the attitude (pitch, roll, and yaw) represented as angles formed between the optical axis of a light beam and reference lines of the position locating instrument. However, the conventional method using the wedge prisms can find only two values: the vertical angle and the horizontal angle. Of the rest of the parameters, the distance, the pitch, and the roll are measured using other position locating methods. This makes the tunnel survey time- and labor-consuming and inefficient. In addition, there is no means for measuring the yaw, which can be a factor in generating error when the slave devices are increased in number.

The present invention has an object to achieve a position locating instrument for a position locating method in which slave devices arranged in a line emit and receive a light beam, the position locating instrument reducing error factors, increasing survey accuracy, and improving survey efficiency by providing all or some of necessary position and attitude parameters.

CITATION LIST

Patent Literature

PTL 1: Japanese Patent Laid-Open No. 2002-090142
PTL 2: Japanese Patent Laid-Open No. 2004-015476
PTL 3: Japanese Patent Laid-Open No. 2012-014148

Non Patent Literature

NPL 1: Kunihiro Maeda, "New Technique for Measuring Curve Positions—Prism—", Gekkan Suishin Gijutsu, pp. 10 to 15, Vol. 18, No. 6, 2004

SUMMARY OF INVENTION

To achieve the above object, an aspect of the present invention is a position locating instrument including at least one light emission port through which light from a wavelength-changeable light source is emitted; and at least one light receiving port that receives light emitted or reflected by an adjacent position locating instrument, wherein the light emitted from the light emission port has a fanlike pattern and has an emission angle varying, as a monotonic function of a wavelength of the light, in a direction perpendicular to a direction in which the light spreads in the fanlike pattern, and a wavelength of light detected by the position locating instrument after being emitted by the adjacent position locating instrument, or a wavelength of light detected by the position locating instrument after being emitted by the position locating instrument and then reflected by the adjacent position locating instrument is obtained so that at least one of parameters for relative positional relation and attitude of the position locating instrument is measured.

DESCRIPTION OF EMBODIMENTS

An embodiment of the present invention is described in detail below with reference to the drawings.

(Optical Beam Scanner)

Figure 1A:
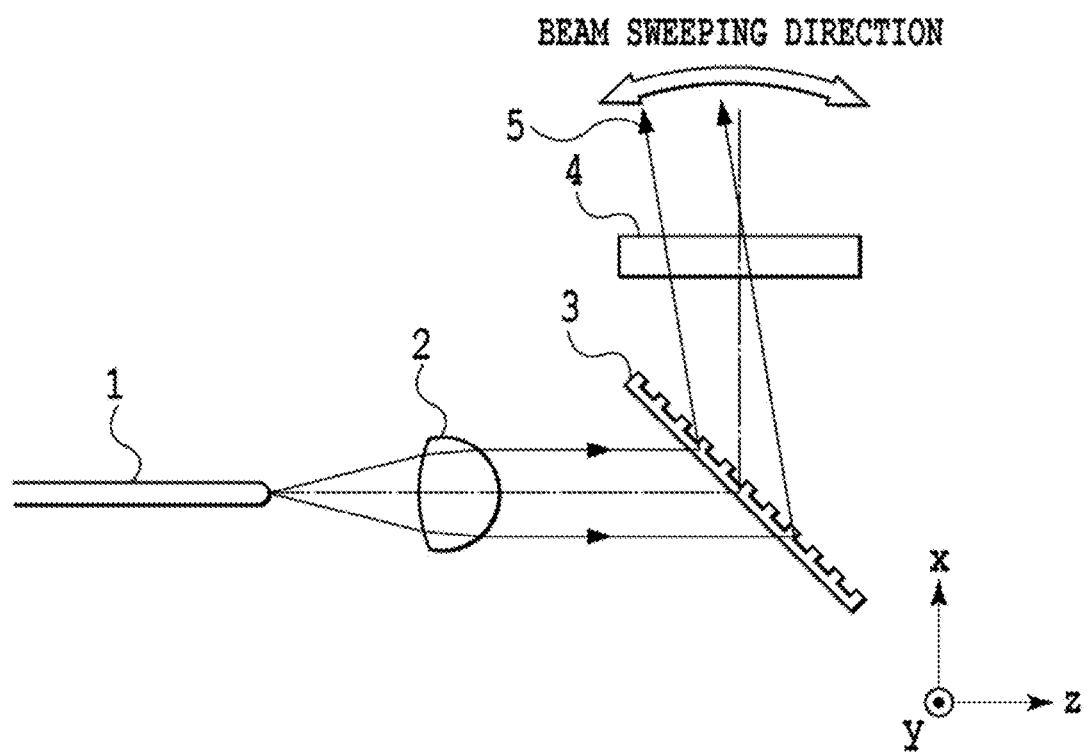
FIG. 1A is a top view of an optical beam scanner that generates sweeping fanlike light whose emitting light is a monotonic function of the wavelength of light.
Figure 1B:
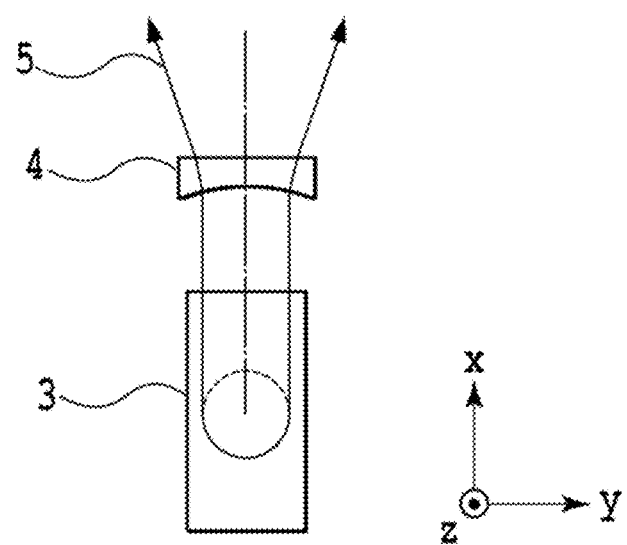
FIG. 1B is a side view of the optical beam scanner that generates sweeping fanlike light whose emitting light is a monotonic function of the wavelength of light.

FIGS. 1A and 1B show an optical beam scanner that generates sweeping fanlike light whose emitting light angle is a monotonic function of wavelength of light. The entire or part of light emitted from a wavelength-changeable light source of a master device is led to a slave device using an optical fiber 1. In the case when a part of the light is branched into the slave device, the rest of the light is passed to another slave device at a lower side using another optical fiber. In the optical beam scanner, diversing light emitted from an end portion of the optical fiber 1 is collimated by a collimator lens 2 and then incident on a transmission diffraction grating 3. In FIG. 1, the grating vector of the diffraction grating 3 is in the xz plane.

A diffraction angle $\varphi$ is given by $$\phi = \sin^{-1}\left(\frac{\lambda}{\Lambda} - \sin\theta\right) \quad \text{(Expression 1)}$$

where $\theta$ is an incident angle with respect to the grating normal of the diffraction grating 3, $\Lambda$ is the grating pitch, and $\lambda$ is the wavelength of light. Since the incident angle $\theta$ and the grating pitch $\Lambda$ are fixed, the diffraction (emission) angle $\varphi$ is a monotonic function of the wavelength $\lambda$ of light. When $\lambda$ changes, the direction of emission (beam sweeping) changes in the xz plane in FIG. 1.

The diffracted light is spread like a fan on the xy plane by a cylindrical concave lens 4 and thus formed into sweeping fanlike light 5. The sweeping fanlike light 5 is emitted while sweeping in such a manner that its traveling direction changes, according to the wavelength of light, in a direction (z-axis direction) perpendicular to the direction of the fanlike spreading. The cylindrical concave lens 4 is installed such that the direction of its lens power is in the y-axis direction on the xy plane in FIG. 1. A cylindrical convex lens may be used in place of the cylindrical concave lens. In this case, the light converges at a focal point, and then becomes fanlike emission light at a distance.

(Optical Beam Scanner of the Position Locating Instrument)

Figure 2:
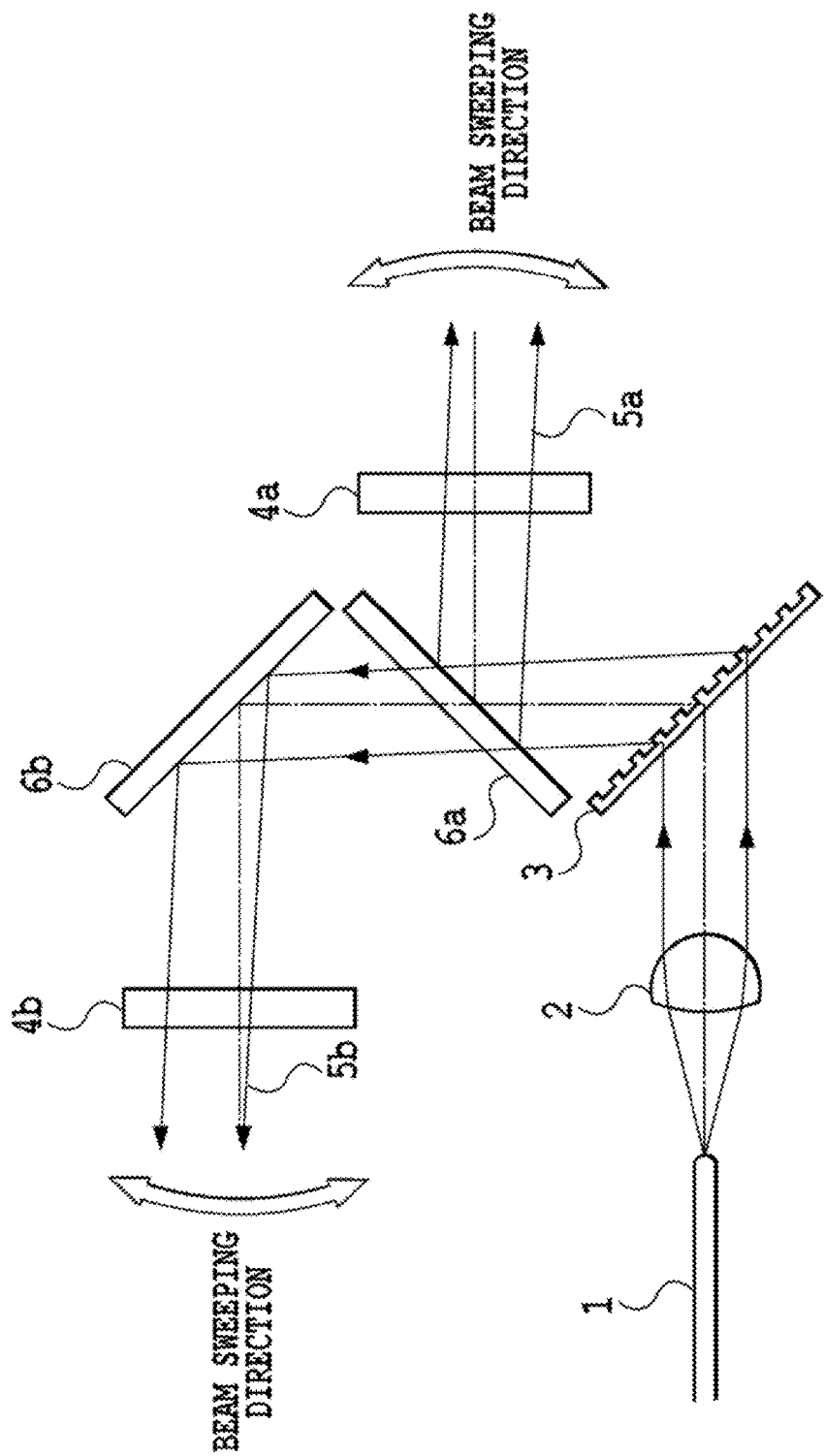
FIG. 2 is a top view of an optical beam scanner that emits sweeping fanlike light to the front and the back of a position locating instrument.

FIG. 2 shows an optical beam scanner that emits sweeping fanlike light to the front and the back of a position locating instrument at the same time. A half mirror 6a and a mirror 6b are added at the back of the diffraction grating 3 shown in FIGS. 1A and 1B. Light reflected by the half mirror 6a passes through a cylindrical concave lens 4a and goes out as forward emission light 5a. Light transmitted through the half mirror 6a and then reflected by the mirror 6b passes through a cylindrical concave lens 4b and goes out as backward emission light 5b. The half mirror 6a may be turned 90° clockwise and the mirror 6b may be turned 90° counter-clockwise, respectively, so that light reflected by the half mirror 6a is emitted backward and the light transmitted through the half mirror 6a and then reflected by the mirror 6b is emitted forward, instead.

In an alternative configuration, the cylindrical concave lens 4a may be turned 90° around the y axis and moved to a position between the grating 3 and the half mirror 6. This configuration allows elimination of the cylindrical concave lens 4b. The same is true of the case where cylindrical convex lenses are used in place of the cylindrical concave lenses.

(How Light Beams Travel Among Adjacent Slave Devices)

Figure 3:
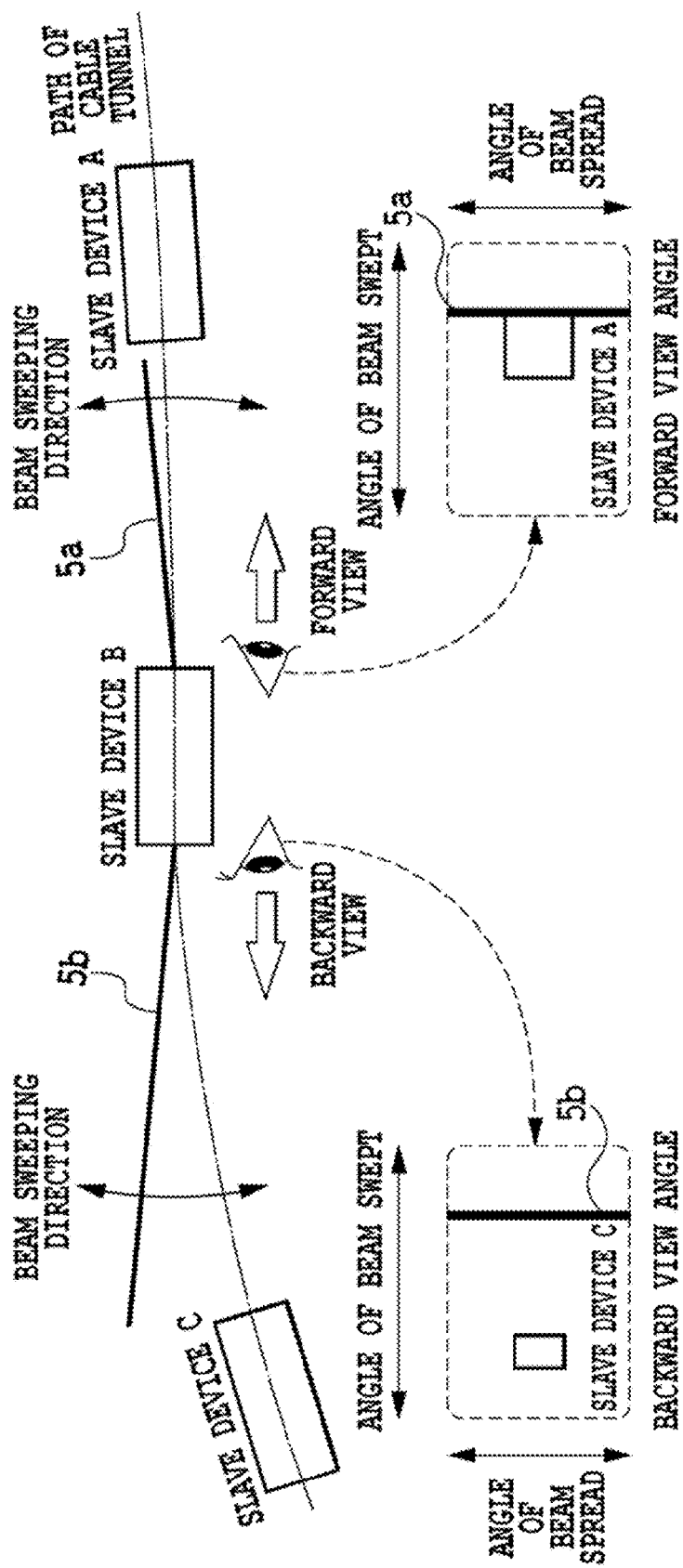
FIG. 3 is a diagram showing how light beams travel from a light-emitting slave device (position locating instrument) to slave devices in front of and behind the light-emitting slave device.

FIG. 3 shows how light beams travel from a light-emitting slave device (position locating instrument) to slave devices (position locating instruments) in front of and behind the light-emitting slave device. In FIG. 3, a slave device B emits light beams forward and backward. The front (i.e., lower-side) slave device is called a slave device A, and the rear (i.e., upper-side) slave device is called a slave device C herein. Each of the slave devices has to be positioned in the tunnel within the reach of its adjacent slave devices. Herein, "within the reach" means that fanlike light emitted from a slave device reaches its adjacent slave devices within its scanning range as a function of the wavelength-changeable range. Concerning the forward view seeing from the slave device B to the slave device A, the forward view angle in FIG. 3 is limited by an "angle of beam spread" determined by the cylindrical concave lens and an "angle of beam swept" determined by the diffraction grating and the wavelength-changeable range. The slave device A has to be positioned within the forward view angle. Concerning the backward view seeing from the slave device B to the slave device C, the slave device C has to be positioned within a backward view angle as well.

(Arrangement of the Light Emission Ports and the Light Receiving Ports of the Slave Devices)

Figure 4A:
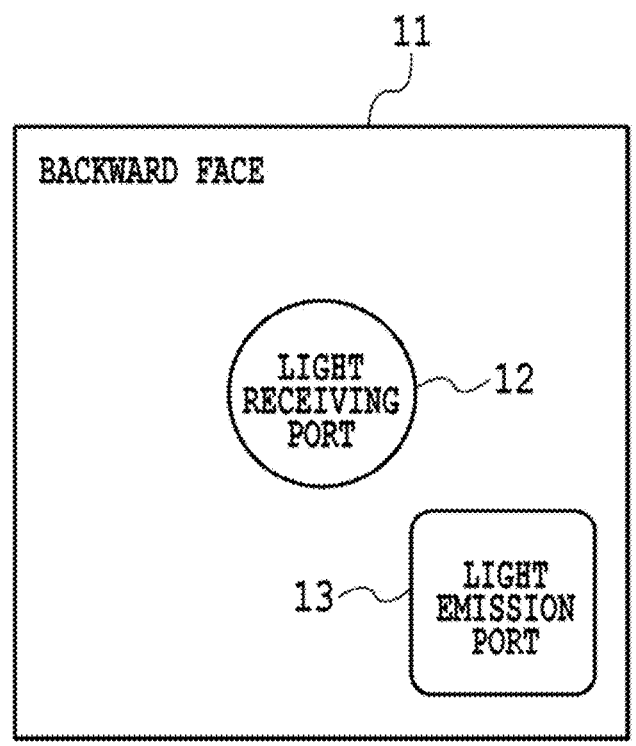
FIG. 4A is a diagram showing the arrangement of a light emission port and a light receiving port of a slave device.
Figure 4B:
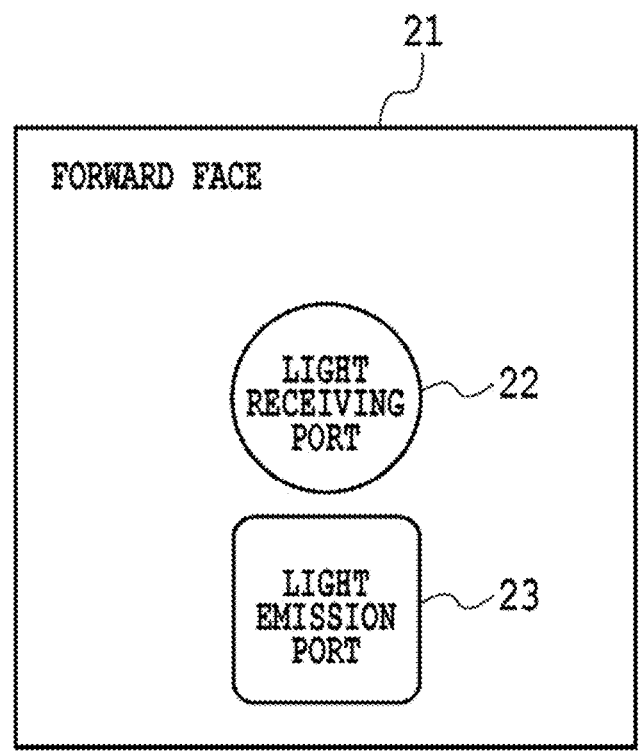
FIG. 4B is a diagram showing the arrangement of a light emission port and a light receiving port of a slave device.

FIGS. 4A and 4B show a simplest example of the arrangement of a light emission port and a light receiving port built in each slave device (position locating instrument). Light emitted by the slave device B is received by a light receiving port 12 in a backward face 11 (FIG. 4A) of the slave device A and a light receiving port 22 in a forward face 21 (FIG. 4B) of the slave device C. The wavelength of light emitted from the wavelength-changeable light source in the master device is varied to find wavelengths that maximize the amounts of light received by the light receiving ports. Then, with these wavelengths, the angle of the slave device A relative to the slave device B and the angle of the slave device C relative to the slave device B can be calculated using (Expression 1). The "angle of the slave device C relative to slave device B" is equivalent to the "attitude of the slave device B relative to the slave device C". The following describes the reason for this using FIG. 5.
(Arrangement of the Position Locating Instruments at a Tunnel Construction Site)

Figure 5:
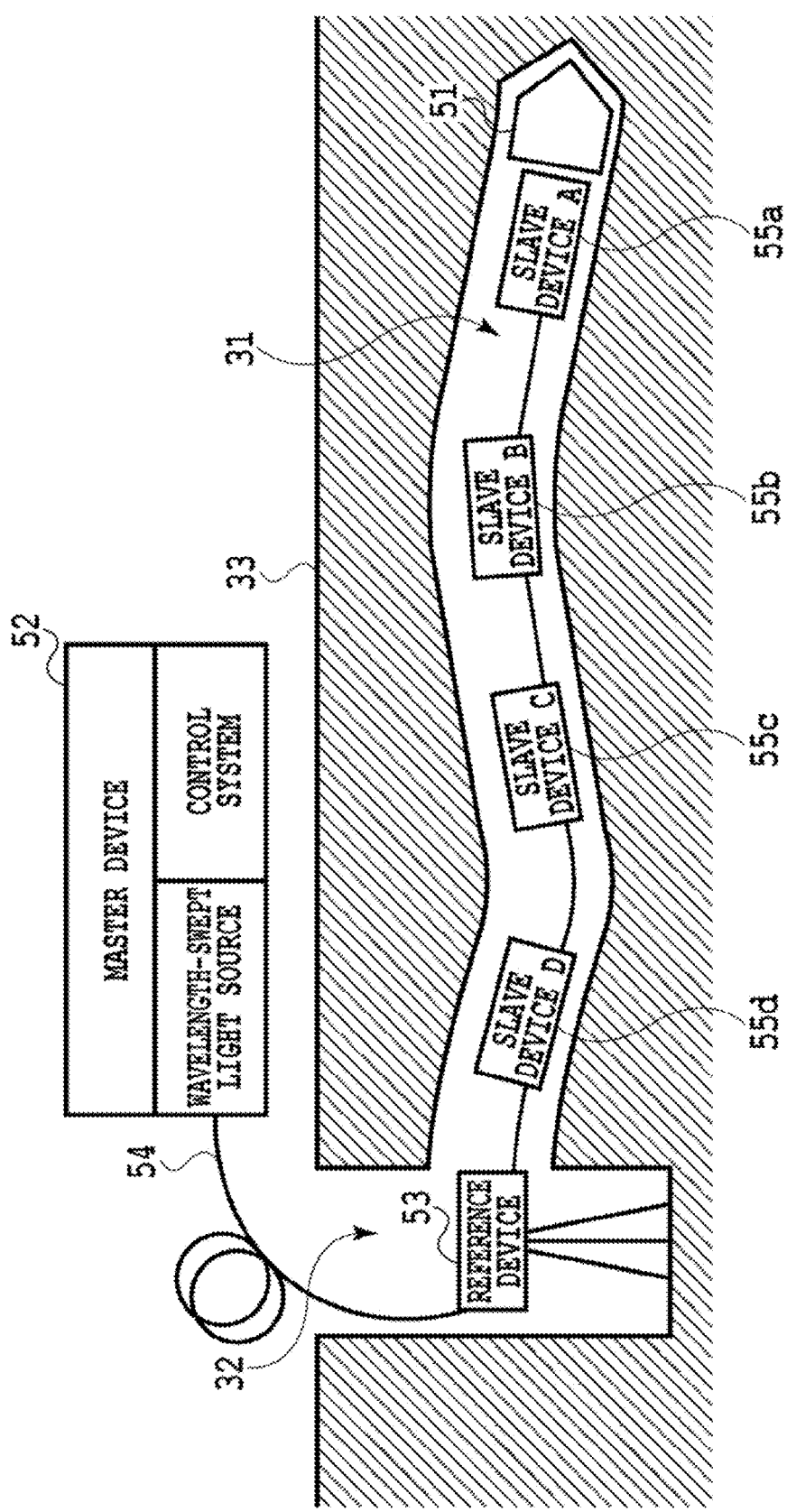
FIG. 5 is a diagram showing the arrangement of position locating instruments at a tunnel construction site.

FIG. 5 shows an example of the arrangement of position locating instruments at a tunnel construction site. A reference device 53 connected to a master device 52 via optical fiber and electric wiring 54 is placed in a shaft 32. Slave devices (A to D) 55a to 55d are arranged inside an underground tunnel 31 formed by an excavator 51, and are connected to one another by the optical fiber and electric wiring 54. Wavelength-swept light is supplied from the wavelength-swept light source in the master device to the reference device 53 and the slave devices 55a to 55d via the optical fiber. The reference device 53 placed in the shaft 32 determines all the reference coordinates for the tunnel construction and determines the direction of excavation based on survey results obtained on a land surface 33. The position locating instrument may integrally include the reference device 53 and the master device 52 having the wavelength-swept light source and a control system, or the reference device 53 and the uppermost-side slave device (D) 55d.

The slave device 55d receives light emitted from the reference device 53 toward the slave device 55d. The wavelength of the light thus received can be used to obtain the position of the slave device 55d in the coordinate system given for the reference device 53. Next, the reference device 53 receives light emitted from the slave device 55d. The wavelength of the received light can be used to obtain the position of the reference device 53 relative to the slave device 55d. However, since the position of the reference device 53 is fixed, the "position of the reference device relative to the slave device" is equivalent to the "attitude of the slave device relative to the reference device".

The position of the slave device 55d (only the angle as a function of wavelength) and the attitude of the slave device 55d (only the angle as a function of wavelength) are thus determined in the coordinate system given for the reference device 53. Next, the position of the slave device 55c is revealed when the slave device 55c receives light from the slave device 55d, and the attitude of the slave device 55c is revealed when the slave device 55d receives light from the slave device 55c. In the same way, the position and the attitude are determined sequentially from an upper-side slave device to a lower-side slave device to obtain the position and attitude parameters for each slave device.
(Determination of the Other Parameters)

The position and attitude parameters obtained by the above method are limited to only angles that are functions of wavelength. The axis of rotation for the "angle as a function of wavelength" is desirably parallel to the gravity (i.e., in the vertical direction, and the plane of rotation for the angle is the horizontal plane). The position of a slave device on the horizontal plane and the attitude (yaw) of the slave device relative to the optical axis on the horizontal plane can be measured using horizontal diffraction of light spread vertically like a fan.

The other parameters can be obtained using other methods. For example, the distances between the slave devices can be obtained by measuring how long distance each slave devices is pushed into the tunnel. The height can be obtained by making a pipe run through the cable tunnel and measuring hydrostatic pressure at multiple locations. The pitch and roll of the attitude angles of a slave device can also be measured using a clinometer to measure the angles of the slave device relative to gravity.

Nevertheless, the other parameters can also be measured if the light receiving ports and the light source are appropriately configured. This improves the convenience of the position locating instrument, as well as position locating accuracy and efficiency. The following describes such configurations.
(Determination of the Wavelength of the Wavelength-Swept Light Source and Distance Measurement Using Triangulation)

Figure 6:
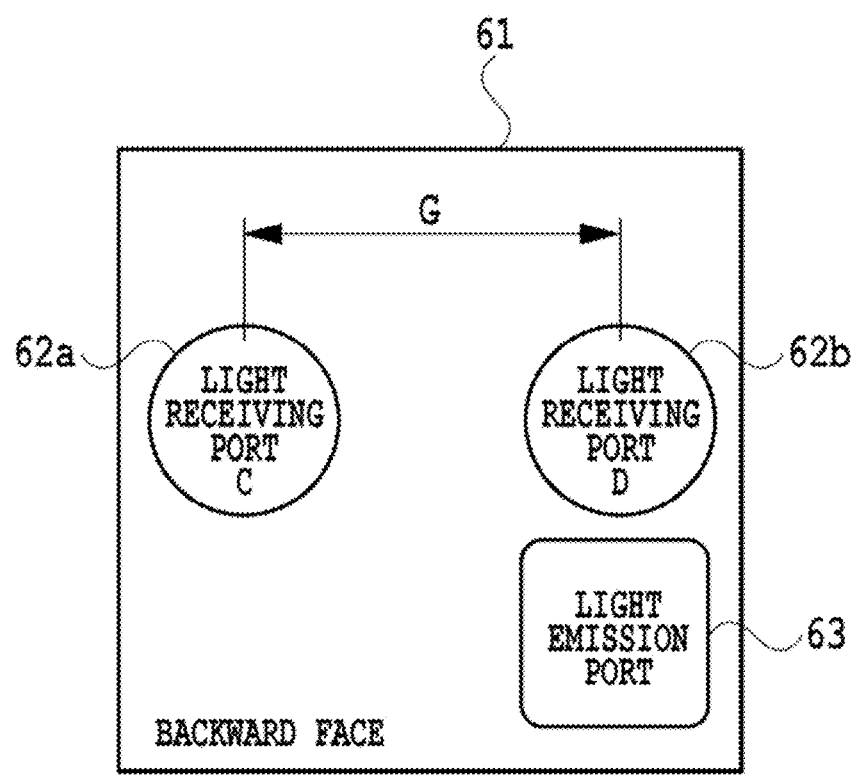
FIG. 6 is a diagram showing the arrangement of light receiving ports that enables triangulation measurement of the distance between slave devices.

FIG. 6 shows the arrangement of multiple light receiving ports of a slave device that enables measurement of the distance between slave devices using triangulation. A light beam emitted forward from an upper-side slave device is received by two light receiving ports 62a, 62b in a backward face 61 of an adjacent slave device, the light receiving ports 62a, 62b being spaced from each other by a distance G in the sweeping direction of the light beam. The triangulation distance measurement employs a wavelength-swept light source, whose emitting light oscillates in wavelength in a constant frequency within a predetermined wavelength range.

Figure 7:
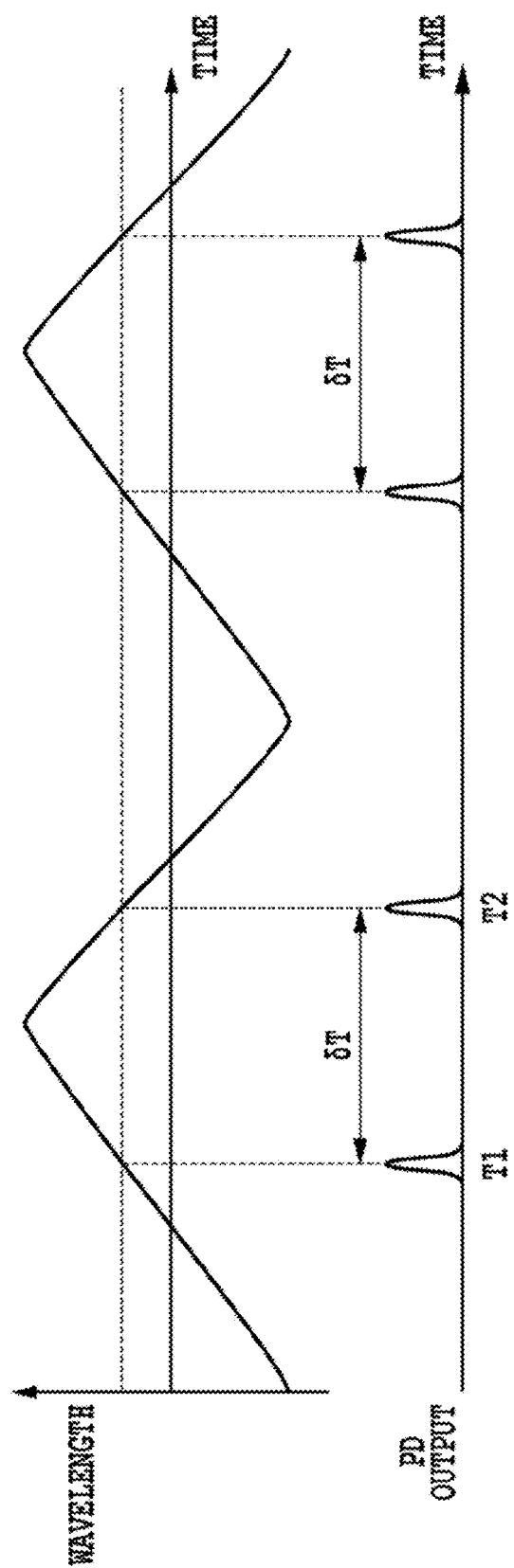
FIG. 7 is a diagram illustrating a method using a wavelength-swept light source to obtain the wavelength of received light based on timings that the light is received.

With reference to FIG. 7, it is described how to derive the wavelength of the received light from the receiving timing when a wavelength-swept light source is employed. FIG. 7 shows the time development of the wavelength generated by the light source and a light detection signal from one of the light receiving ports of the light-receiving slave device. According to (Expression 1), wavelength and angle are in one-to-one relation. Thus, in one cycle, the light receiving port detects light at the same wavelength twice: when the light sweeps from the short wavelength to the long wavelength and when the light sweeps from the long wavelength to the short wavelength. With T1 representing a timing of the light detection during the sweep from the short wavelength to the long wavelength and T2 representing a timing of the light detection during the sweep from the long wavelength to the short wavelength, their time difference 6T is T2−T1. Since 6T is a function of wavelength, the wavelength can be obtained based on 6T. It is possible on condition that the time dependence of wavelength from the employed wavelength-swept light source is obtained in advance.

A description is given of how T1 and T2 are measured using a bandpass filter with a narrow passband that only allows transmission of light at a particular wavelength ($\lambda_B$) and an interferometer with an optical path difference L. In the master device, about one percent of light aside from the majority of the light allocated to the slave devices is incident on a photodetector ($PD_B$) via the bandpass filter and to the interferometer. Then, electric signals outputted from the photodetector and the interferometer are inputted to Channel 1 (CH1) and Channel (CH2) of an oscilloscope, respectively. The oscilloscope is triggered by a sweep start signal from the wavelength-swept light source. Thereby, it can be distinguished whether the oscilloscope is showing a signal during the sweep from the short wavelength to the long wavelength or a signal during the sweep from the long wavelength to the short wavelength. In the sweep from the short wavelength to the long wavelength, a wavelength at a peak timing ($t_B$) of CH1 is $\lambda_B$, and one cycle of a periodic signal appearing on CH2 corresponds to the wavenumber difference of $2\pi/L$. Based on this, the wavelength ($\lambda$) at a timing t (t>$t_B$) is expressed as $$\lambda^{-1} = \frac{2\pi}{\lambda_B} + m\frac{2\pi}{L} + \frac{\xi}{L} \qquad \text{(Expression 2)}$$

where m is number of peaks (0 or a positive integer) of CH2 between t and $t_B$, and ξ is the length, in radians, of the rest of the cycle (0≤ξ<2π).

When t<$t_B$, m is 0 or a negative integer, and −2π<ξ≤0. In the sweep from the long wavelength to the short wavelength, m is 0 or a negative integer and −2π<ξ≤0 when t>$t_B$, and m is 0 or a positive integer and 0≤ξ<2π when t<$t_B$. An inverse function T1=$\tau_U$(λ) of time dependence $\lambda_U$(t) of the wavelength for the sweep from the short wavelength to the long wavelength and an inverse function T2=$\tau_D$(λ) of time dependence $\lambda_D$(t) of the wavelength for the sweep from the long wavelength to the short wavelength are calculated. Next, $$\delta t = \tau_D(\lambda) - \tau_U(\lambda) \quad \text{(Expression 3)}$$

is calculated, and then finally, its inverse function $$\lambda = \lambda_G(\delta t) \quad \text{(Expression 4)}$$

is prepared. Thus, the wavelength of light received by a slave device can be obtained based on the difference in timings that the slave device detects the light within one sweep cycle. This wavelength determination method using a wavelength-swept light source is applicable to measurement other than the triangulation distance measurement, which will be described below.

The triangulation distance measurement uses a sweeping angular velocity (∂θ/∂t) of a fanlike beam, which can be obtained using (Expression 1) based on a wavelength swept velocity (∂λ/∂t) obtained using (Expression 2) for each wavelength.

In FIG. 6, G is the distance between the centers of the two light receiving ports (C, D) 62a, 62b. The distance between the slave devices ($L_D$) is obtained using the following expression based on the sweep angular velocity (∂$\theta_m$/∂t) of a fanlike beam for an average wavelength $\lambda_m$ (=($\lambda_C$+$\lambda_D$)/2) of the wavelength $\lambda_C$ of light received by the light receiving port C at a timing $t_C$ and the wavelength $\lambda_D$ of light received by the light receiving port D at a timing $t_D$.

$$L_D = \frac{G}{(t_D - t_C)\frac{\partial \theta_m}{\partial t}} \quad \text{(Expression 5)}$$

The measurement accuracy can be improved as follows. The measurement is repeated to increase the number of measurements (N), and the measured distances are averaged. Then, the standard deviation of measurement error decreases in reverse proportion to the square root of the number of measurements. Thus, improvement in measurement accuracy can be achieved.

(Distance Measurement Using the Time-of-Flight Method)

Figure 8A:
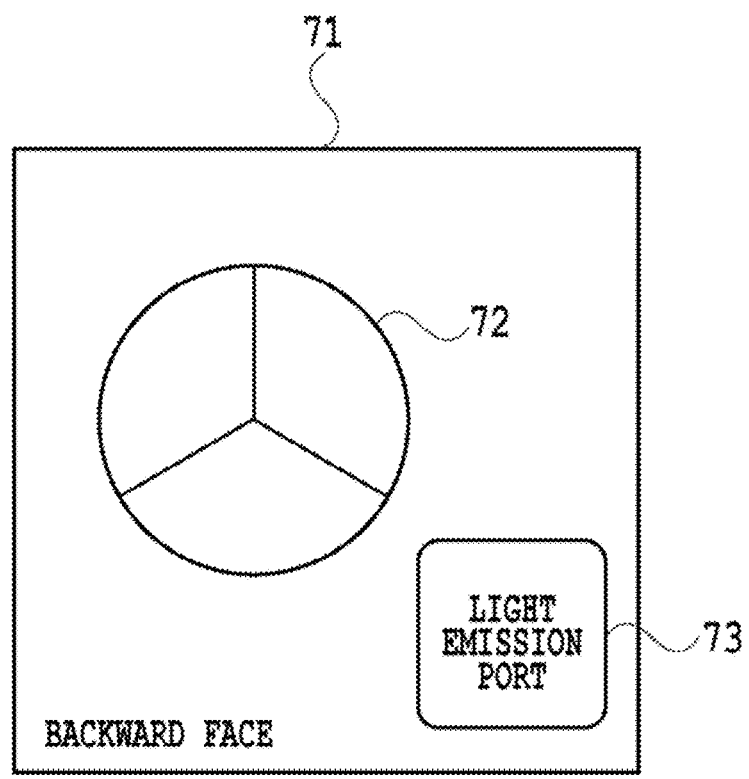
FIG. 8A is a diagram showing the placement of the light receiving port of a slave device that enables time-of-flight measurement of the distance between position locating instruments.
Figure 8B:
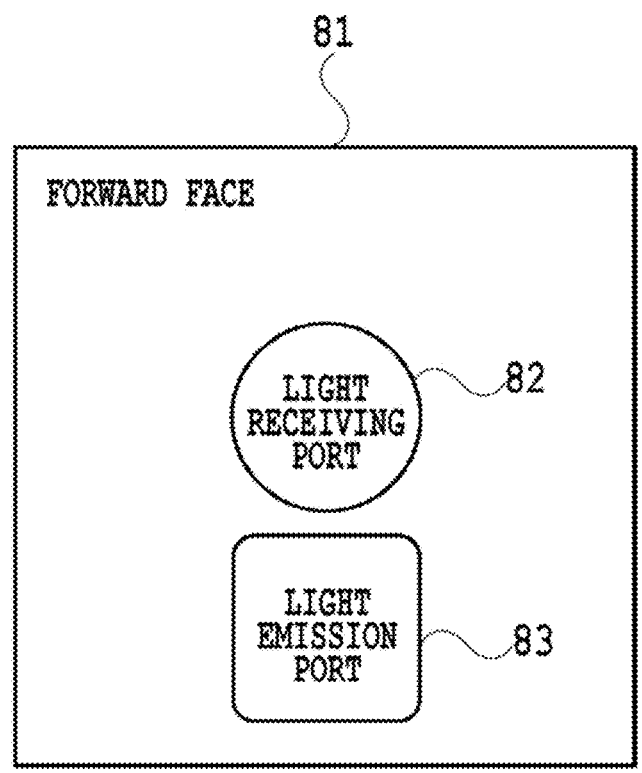
FIG. 8B is a diagram showing the placement of the light receiving port of the slave device that enables time-of-flight measurement of the distance between position locating instruments.

FIG. 8A shows the placement of the light receiving port of a slave device that enables measurement of the distance between position locating instruments using the time-of-flight method. A light beam emitted forward from an upper-side slave device is reflected backward by a retroreflector (which is an optical reflector element, such as a corner-cube prism, that reflects incident light always in a direction of the incidence) 72 provided in a backward face 71 of an adjacent slave device, and is received by a light receiving port 82 close to a light emission port 83 located in a forward face 81 of the upper-side slave device (FIG. 8B). The intensity of the light source has to be modulated in some way to perform the time-of-flight distance measurement.

Figure 9:
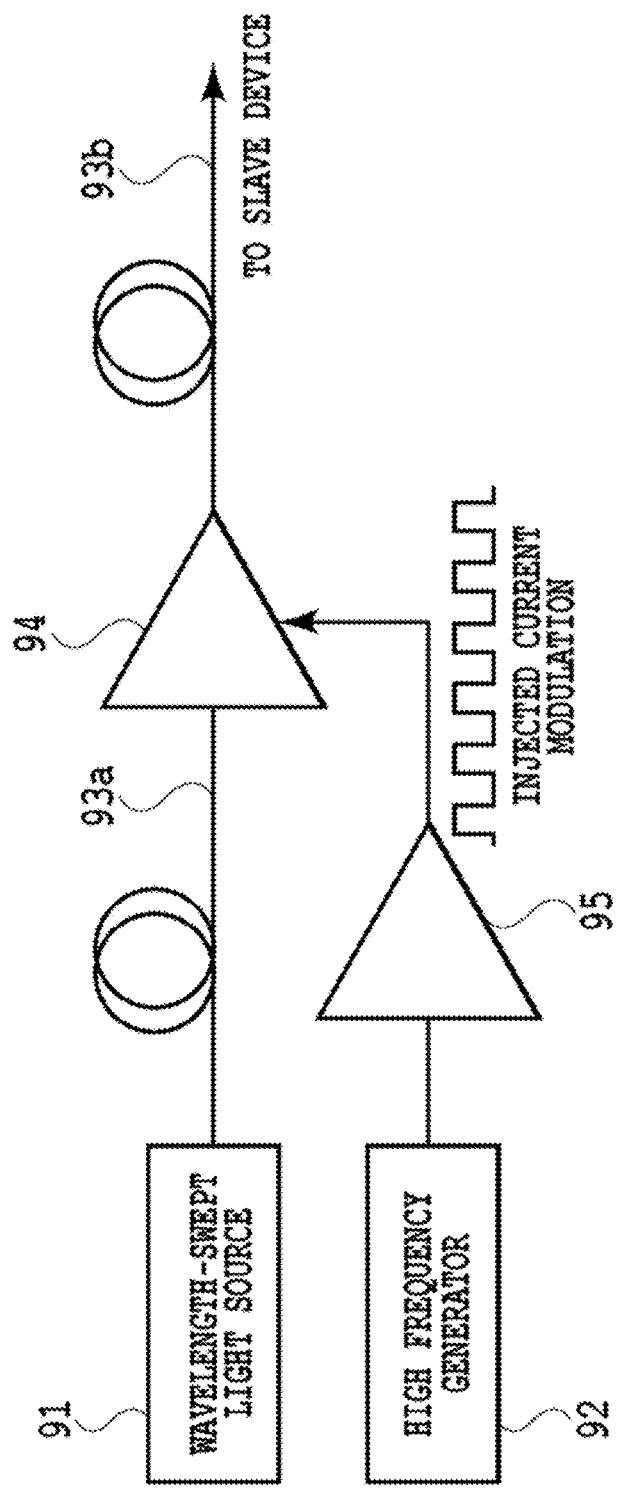
FIG. 9 is a diagram showing an apparatus that modulates the light power from the wavelength-swept light source at high frequency.

FIG. 9 shows an apparatus that modulates the light power from the wavelength-swept light source at high frequency. Emission light from a wavelength-swept light source 91 is incident on an optical amplifier 94, such as a semiconductor optical amplifier (SOA). The apparatus performs the light power modulation by modulating the amplification factor of the optical amplifier 94 with a high-frequency generator 92 through a current amplifier 95. Simultaneously with the wavelength sweeping, a slave device is supplied, via an optical fiber 93, with light the intensity of which has been modulated at a much higher intensity (e.g., about 1 to 100 megahertz) than the repetition frequency of the wavelength sweeping (normally about several kilohertz).

Figure 10:
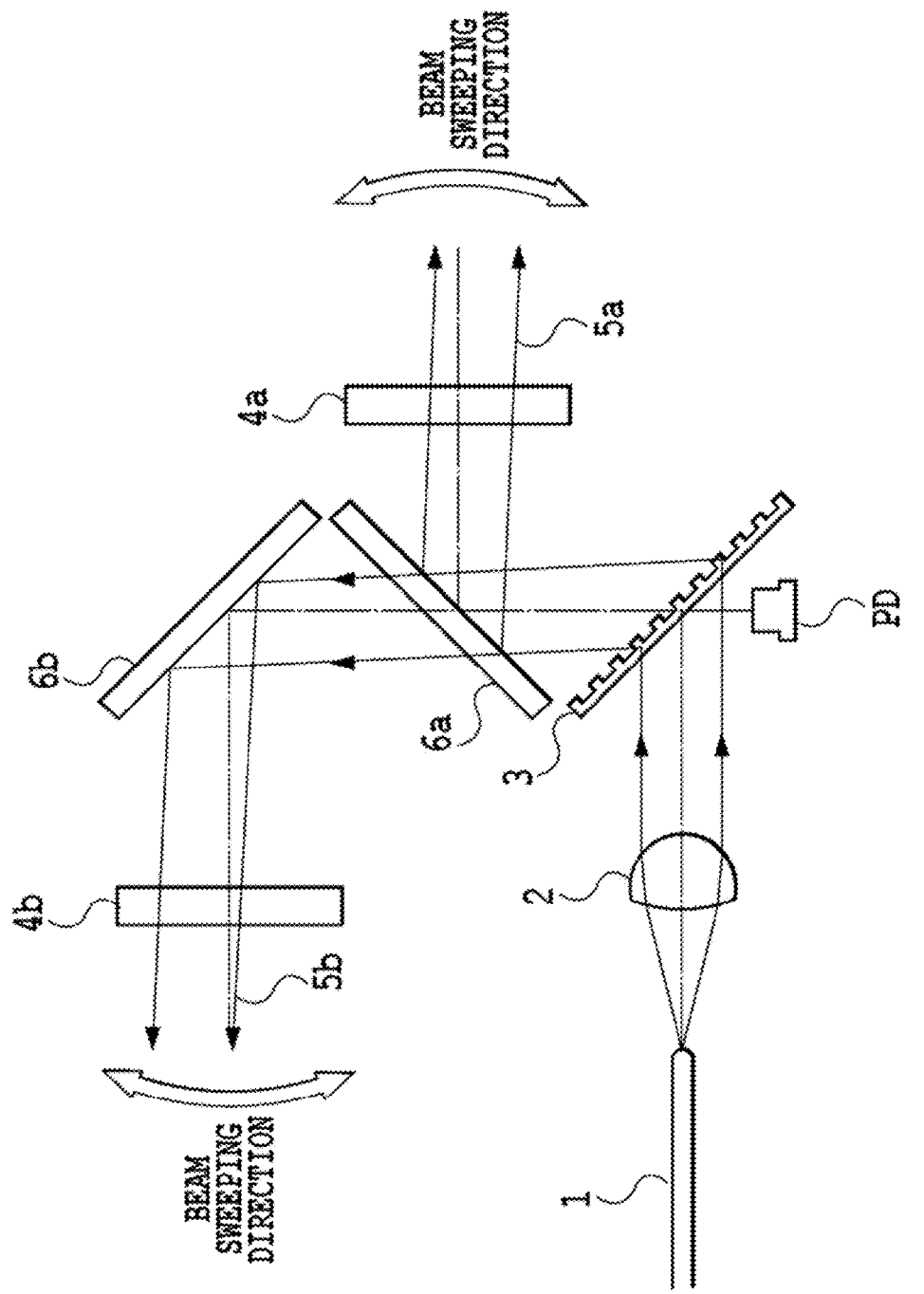
FIG. 10 is a top view of an optical beam scanner used for the time-of-flight measurement of the distance between position locating instruments.

FIG. 10 shows an optical beam scanner used for the time-of-flight measurement of the distance between position locating instruments. To use as a reference signal, an upper-side slave device needs to have a photodetector incorporated in its optical beam scanner. In the optical beam scanner shown in FIG. 2, a small amount of reflected light or zero-order transmitted light generated by the diffraction grating 3 is received by a photodetector PD and used as a reference signal. This reflected light does not exist ideally, but exists in reality because an anti-reflecting coating on the surface is inevitably imperfect. Instead of the reflected light or zero-order transmitted light generated by the diffraction grating 3, part of the incident light may be split by a fiber coupler or the like interposed in the optical fiber 1 of the slave device and then incident on the photodetector PD as reference light.

Figure 11A:
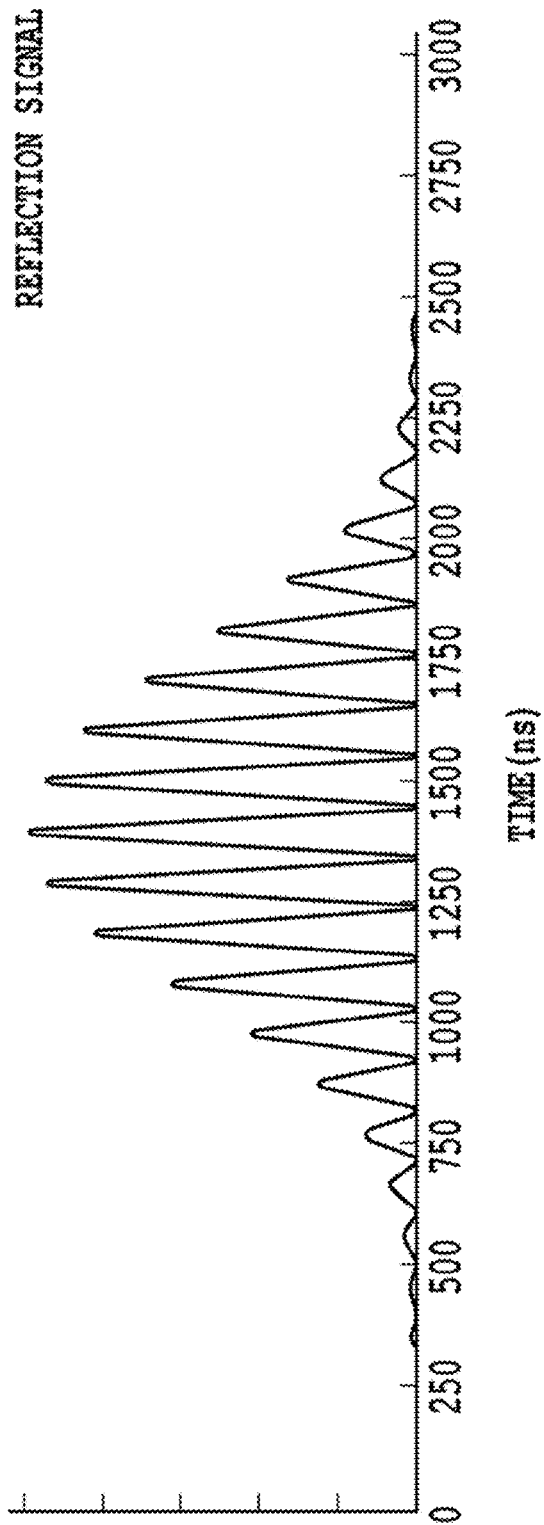
FIG. 11A is a diagram showing a reflection signal converted from light reflected by a retroreflector.
Figure 11B:
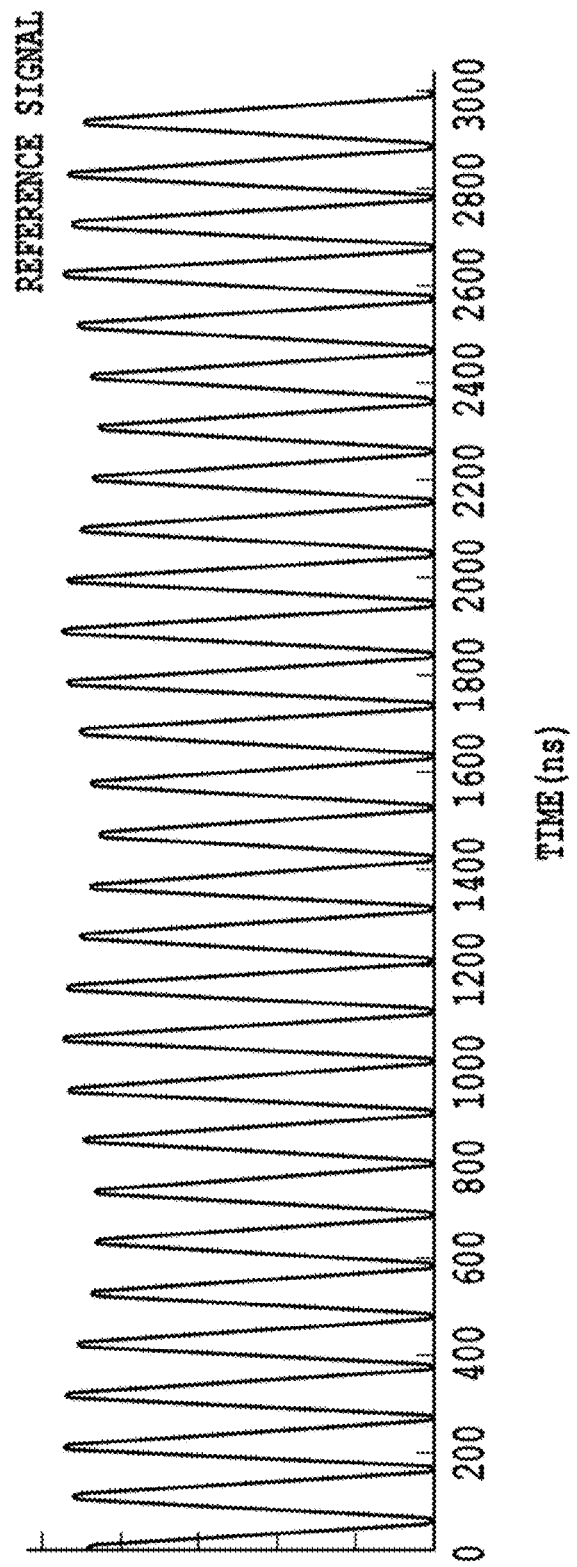
FIG. 11B is a diagram showing a reference signal from the retroreflector.

FIG. 11A shows an example of a reflection signal converted from intensity-modulated light reflected by the retroreflector, and FIG. 11B shows an example of a reference signal. The reflection signal is not detected unless light is emitted at an appropriate angle (wavelength) so as to point to the retroreflector of an adjacent slave device. When a wavelength-swept light source is used, the reflection signal is detected within a particular timing with a pulse shape as shown in FIG. 7 illustrating the PD output. Since the reflected light has been modulated in intensity, the pulsed reflection signal received at a certain light reception angle is also modulated in intensity. The reference signal, on the other hand, repeats pulsation constantly in a cycle of the intensity modulation. Using intensity-modulated light is advantageous because it not only enables distance measurement using the time-of-flight method, but also increases noise resistance with the use of a bandpass filter for extracting a frequency component comparable with the cycle of the light modulation to obtain the angle of light received.

To fly a distance twice as long as the distance between slave devices (2$L_D$), time of flight of 2$L_D$/c is needed, where c is the speed of light. The phase difference (ζ) between the reference signal measured inside the slave device and the reflection signal for the reflected light from the retroreflector is expressed as $$\zeta = \frac{4\pi L_D f}{c} \quad \text{(Expression 6)}$$

where f (Hz) is the frequency of the intensity modulation. For example, when f=20 MHz, ζ=2π$L_D$×0.13333, and the distance between slave devices is the integral multiple of 7.5 m, and the phase difference is 2π. When the phase difference (ζ) is known, the distance $L_D$ between slave devices is expressed as $$L_D = \frac{\zeta c}{4\pi f} + M \frac{c}{2f} \quad \text{(Expression 7)}$$

where M is 0 or a positive integer. The unknown value M can be obtained based on the condition that when a phase difference ($\zeta_1$) is obtained for a different frequency ($f_1$), (Expression 8), which is similar to (Expression 7), holds true with an integer $M_1$.

$$L_D = \frac{\zeta_1 c}{4\pi f_1} + M_1 \frac{c}{2 f_1} \quad \text{(Expression 8)}$$

To obtain the phase difference for intensity-modulated light between the reflection signal and the reference signal, the reflection signal has to contain multiple cycles of intensity modulation as in FIG. 11. For this, the intensity modulation frequency needs to be a much larger value than the wavelength swept frequency.

In addition, as with the distance measurement using triangulation, the distance measurement may be repeated by the number of times allowed by the wavelength swept frequency×measurement time. When the average of these measured distances is used, measurement error decreases in inverse proportion to the square root of the number of measurements. As described, in addition to the yaw and the position (angle) on the horizontal plane, the distance between slave devices can be measured using triangulation or the time-of-flight method.

(Acquisition of Vertical Position and Attitude Information on the Position Locating Instrument)

The vertical position (angle) can be obtained when a light beam is emitted in a perpendicular (vertical) light sweeping pattern, in addition to the horizontal (lateral) light sweep pattern.

Figure 12:
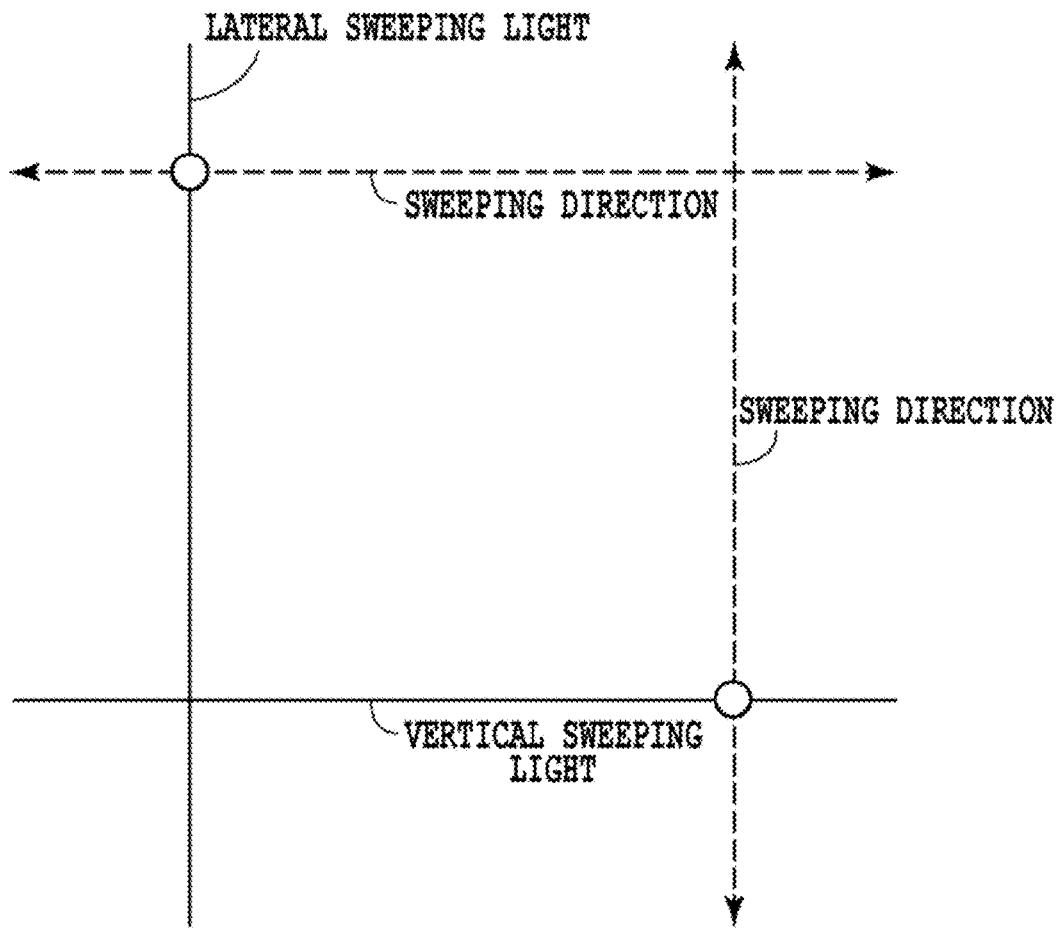
FIG. 12 is a diagram showing sweeping light patterns for measuring all the six position and attitude parameters.

FIG. 12 shows two light sweeping patterns allowing measurement of all the six position and attitude parameters. A position locating instrument emits two types of sweeping fanlike light: a pattern in which light vertically extending in a fan shape sweeps laterally and a pattern in which light laterally extending in a fan shape sweeps vertically. When the position locating instrument is provided with multiple light receiving ports in its face facing an adjacent slave device, the position locating instrument can obtain attitude information on the pitch and roll, in addition to the lateral position (angle), the yaw, the distance between position locating instruments, and the vertical position (angle).

Figure 13A:
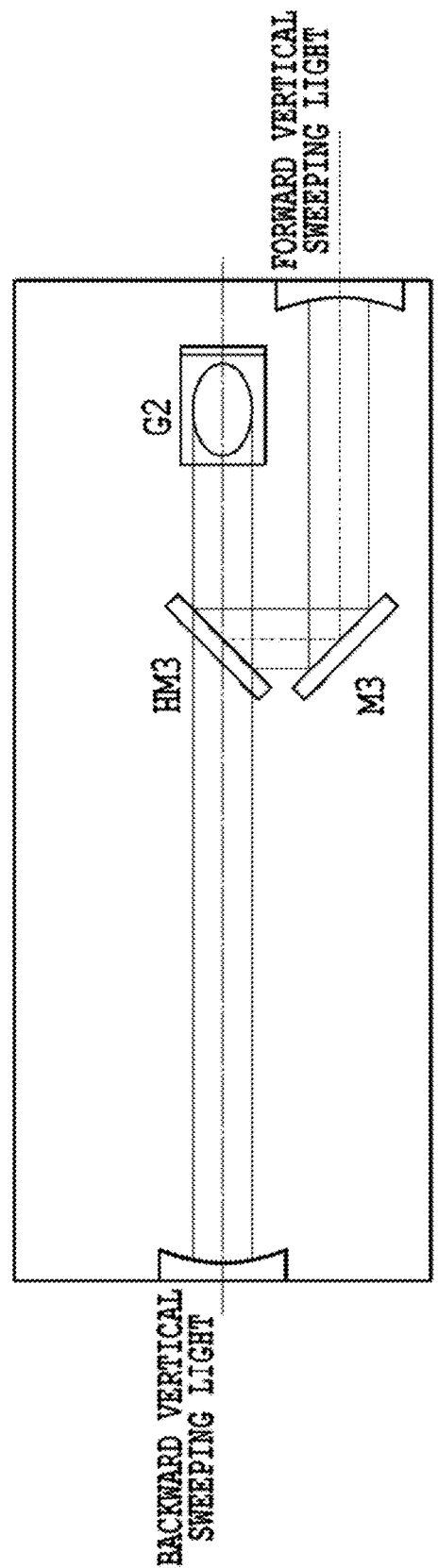
FIG. 13A is an upper-part top view showing a slave-device configuration that allows measurement of all the six position and attitude parameters.
Figure 13B:
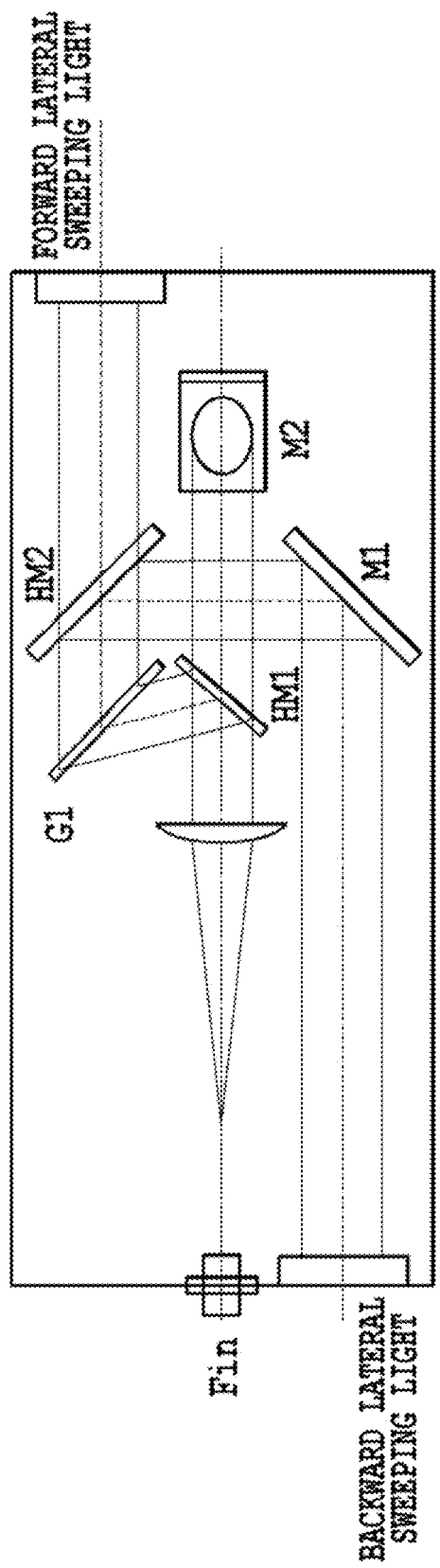
FIG. 13B is a lower-part top view showing the slave-device configuration that allows measurement of all the six position and attitude parameters.
Figure 13C:
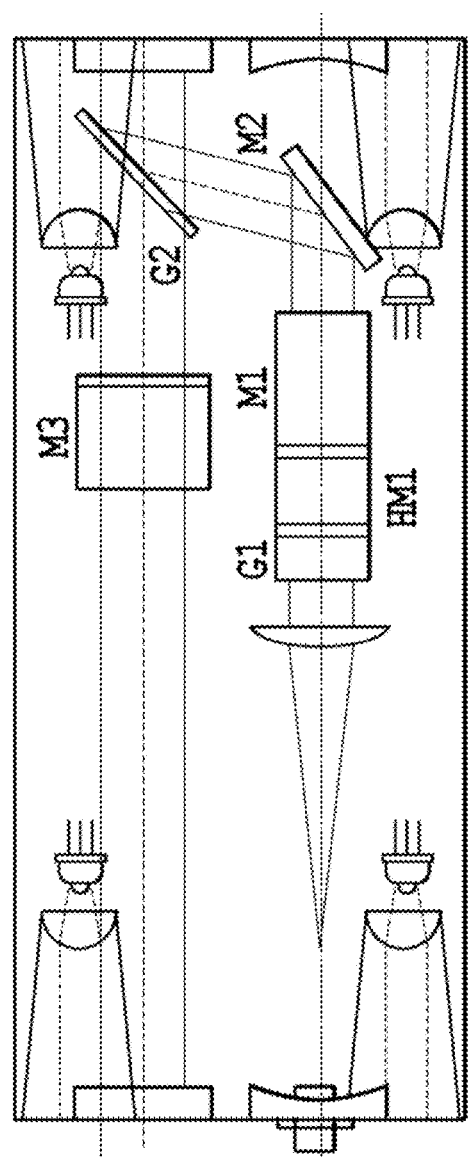
FIG. 13C is a side view showing the slave-device configuration that allows measurement of all the six position and attitude parameters.
Figure 13D:
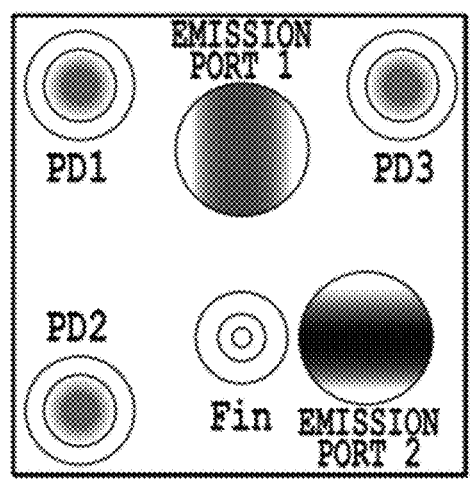
FIG. 13D is a diagram showing a backward face of the slave device that allows measurement of all the six position and attitude parameters.
Figure 13E:
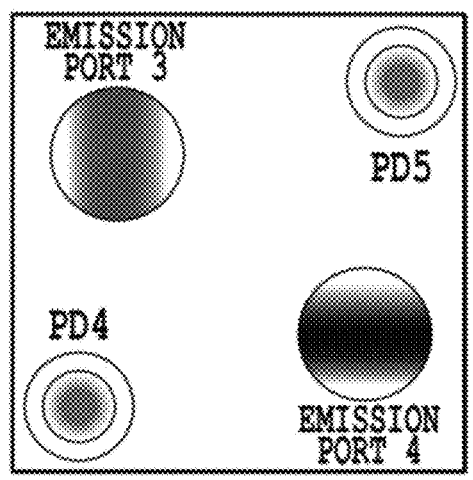
FIG. 13E is a diagram showing a forward face of the slave device that allows measurement of all the six position and attitude parameters.

FIGS. 13A to 13E show the configuration of a position locating instrument (slave device) capable of position-locating all the six parameters. As shown in FIGS. 13B and 13D, light inputted through an optical fiber connection part Fin is collimated by a collimator, and then divided by a half mirror HM1 into light for lateral sweeping and light for vertical sweeping. Light reflected by the half mirror HM1 to be used as the lateral sweeping light is diffracted laterally by a transmission diffraction grating G1, and is then divided by a half mirror HM2 to the front and to the back.

Light transmitted through the half mirror HM2 is vertically spread into a fan shape by a cylindrical concave or convex lens with vertical lens power and emitted forward as forward lateral sweeping light. Light reflected by the half mirror HM2 is reflected again by a mirror M1, vertically spread into a fan shape by a cylindrical concave or convex lens with vertical lens power, and emitted backward as backward lateral sweeping light. In the case where a cylindrical convex lens is used, the light converges at a focal point, and is then emitted as the fanlike light.

The transmission light divided by the half mirror HM1 is reflected upward by a mirror M2 as vertical sweeping light, and as shown in FIGS. 13A and 13D, diffracted vertically by a transmission diffraction grating G2. The diffracted light is divided by a half mirror HM3 to the front and to the back. Light transmitted through the half mirror HM3 is laterally spread into a fan shape by a cylindrical concave lens with lateral lens power and emitted backward as backward vertical sweeping light. Light reflected by the half mirror HM3 is reflected again by a mirror M3, laterally spread into a fan shape by a cylindrical concave lens with horizontal lens power, and emitted forward as forward vertical sweeping light.

As with FIG. 3, it is assumed that a slave device that emits light is a slave device B, a slave device in front of the slave device B is a slave device A, and a slave device behind the slave device B is a slave device C. The roll of the slave device A relative to the slave device B can be obtained based on the difference in timings, between the PD1 and the PD2 of the slave device A, of detecting the forward lateral sweeping light emitted forward from the slave device B. The vertical position (angle) of the slave device A relative to the slave device B can be obtained based on a timing that the PD1 of the slave device A detects the forward vertical sweeping light from the slave device B. In addition, the attitude (pitch) of the slave device B relative to the slave device C can be obtained based on a timing that a PD5 of the slave device C detects the backward vertical sweeping light emitted backward from the slave device B.

As described earlier, the lateral angle and the yaw can be obtained using lateral sweeping light. Using the triangulation distance measurement, the distance can be obtained based on the difference in timings, between the PD1 and the PD3, of detecting lateral sweeping light. The distance measurement may use intensity modulation instead. The position locating instrument can thus measure all the six position and attitude parameters equally accurately, enabling drastic improvement in a position locating system for its accuracy and efficiency in position-locating tunnels or the like, compared to a conventional position locating system.

The present embodiment can obtain the path of a tunnel by placing multiple position locating instruments inside a tunnel being constructed and obtaining multiple parameters, such as the relative positions and attitudes of the position locating instruments. Unlike a conventional system, the present embodiment can obtain not only the relative positions of the position locating instruments, but also other parameters such as their attitudes, and therefore enables drastic improvement in the survey accuracy and efficiency.

SPECIFIC EXAMPLES

Specific examples of the present invention are described in detail below.

Example 1

As the transmission diffraction grating 3 in FIG. 2, a grating of 1200 lines/mm is selected. As the light source, a wavelength-changeable light source which can tune the wavelength from 1260 nm to 1360 nm is used. Light emitted from the wavelength-changeable light source is switched by an optical switch incorporated in each slave device into the inside of the slave device in which the optical switch is incorporated or to supply the light to a lower-side slave device. Light emitted from a single-mode optical fiber 1 with a numerical aperture of 0.14 is collimated into collimated light of 4 mmφ by a collimator lens 2, which is an aspherical lens with a focal length of 13.86 mm. Although not shown in FIG. 2, an anamorphic prism pair that doubles the in-plane beam diameter is inserted between the collimator lens 2 and the transmission diffraction grating 3, so that 4×8-mm oval collimated light is incident on the transmission diffraction grating.

The incident angle with respect to the grating normal of the diffraction grating 3 is 55°. Since the diffraction angle for 1,310 nm, which is the center wavelength, is 48.8°, the cross section of the diffraction light is a 4×9.2-mm ellipse. The diffraction angle is 43.8° for the wavelength of 1,260 nm and is 54.4° for the wavelength of 1,360 nm, which means that more than 10° can be covered. Each cylindrical concave lens 4 through which light passes to be emitted forward or backward has a focal length of −55 mm to spread the emitted light vertically in a fanlike shape at angles of ±2°.

The light receiving ports are arranged as shown in FIG. 6. The forward face and the backward face are each 50×50 mm in cross section, and the light receiving ports 62a, 62b are 12-Romp circles. The light emission port 63 is a rectangle which is 5 mm in length and 15 mm in width. The horizontal distance G between the centers of the light receiving ports 62a, 62b in the backward face is 30 mm.

Referring to FIG. 3, light is emitted from the forward face of the slave device B. The wavelength from the wavelength-changeable light source is gradually changed to find the wavelengths with which the light receiving ports in the slave device A receive the maximum amounts of light. With those wavelengths denoted as $\lambda_1$, $\lambda_2$, their average wavelength $\lambda_0$ ($=-(\lambda_1+\lambda_2)/2$) is assigned to (Expression 1) as $$\Phi=\sin^{-1}(0.83333\lambda_0-0.81915) \quad \text{(Expression 9)}$$

to obtain the lateral angle of the slave device A relative to the slave device B. The unit of the wavelength is nanometers. The following expression $$L_D = \frac{0.03}{|\sin^{-1}(0.83333\lambda_1 - 0.81915) - \sin^{-1}(0.83333\lambda_2 - 0.81915)|} \quad \text{(Expression 10)}$$

finds the distance between the slave device A and the slave device B ($L_D$).

Next, the optical switch is switched to drop light from the wavelength-changeable light source into the slave device A via the optical fiber, and light emitted from the backward face of the slave device A is received by the light receiving port in the forward face of the slave device B. The wavelength with which the light receiving port receives the maximum amount of light is revealed. With this wavelength denoted by $\lambda_3$, the slave device A is measured as being slanted in the horizontal plane relative to the slave device B by $\sin^{-1}(0.83333\lambda_3-0.81915)$.

Example 2

As the light source, a wavelength-swept light source which sweeps between 1,260 nm to 1,360 nm at a frequency of 2 kHz is used. The optical system of the slave device is the same as that in Example 1. The difference from Example 1 is that the wavelength of received light is obtained based on the time difference between when a light receiving port detects the maximum amount of light during sweep from the short wavelength to the long wavelength and when the same light receiving port detects the maximum amount of light during sweep from the long wavelength to the short wavelength. Since the frequency is 2 kHz, 80,000 times of measurement completes within 40 seconds, and use of the average of these measurement values lowers error to 1/283. Since the diameter of each reception part is 12 mm, when the timing of receiving the maximum amount of light is converted to a position, error of 1/10 of the diameter, i.e., about 1.2 mm is inevitable. This error, however, can be reduced to about 4.2 µm by the successive 40-second measurements.

In the triangulation distance measurement which for example measures a distance 50 m away with the distance G between the centers of the light receiving ports 62a, 62b being 30 mm, error in the inter-center distance G is emphasized to 50 m/30 mm, i.e., 1,666 times. A 1.2 mm shift in the inter-center distance G produces an error of 2 m. If the error in the inter-center distance G is 4.2 µm, the error in the 50-m distance measurement is reduced to 7 mm.

Example 3

Although the light source is the same as that used in Example 2, an SOA is inserted between the light source and the slave devices to be able to modulate the intensity at 20 MHz or 15 MHz. Each slave device has the light receiving port shown in FIGS. 8A and 8B. Emission of light from the optical fiber to the inside of the slave device is the same as Example 1. Then, as shown in FIG. 10, the photodetector PD receives light reflected by the transmission diffraction grating 3. A retroreflector 72 of a one-inch diameter is placed in the backward face 71 of the slave device. The three mirrors of the retroreflector 72 are arranged such that their borders are at the 12 o'clock, 4 o'clock, and 8 o'clock positions, as shown in FIG. 8A. In the forward face 81 of the slave device, the light receiving port 82 is located immediately above the light emission port 83. The distance between the center of the light emission port 83 and the center of light receiving port 82 is 12 mm. Current modulation by the SOA is unnecessary for angle measurement.

Referring to FIG. 3, light emitted from the slave device B is reflected by the retroreflector R of the slave device A, and received by the light receiving port in the forward face of the slave device B. The wavelength of light received is obtained based on the timing of receiving the light, in the same way as Example 2. The lateral angle of the slave device A relative to the slave device B is obtained based on the wavelength of received light. The yaw of the slave device A relative to the slave device B is obtained based on light emitted from the backward face of the slave device A and received by the light receiving part in the forward face of the slave device B.

By the angle measurement, the wavelength and detection timing of light from the retroreflector are known. Thus, with the sweep signal from the wavelength-swept light source used as a trigger, trigger delay for an oscilloscope is determined so as to be able to detect the light, and 1,024 samples are acquired at a sampling speed of 250 MSPS. This correspondence to 4 µs of data acquisition. The cross-correlation between a signal from the light receiving port in the forward face ($S_i$: $0 \leq i < 1,024$) and a signal from the photodetector inside the slave device ($R_i$: $0 \leq i < 1,024$) is calculated.

Specifically, each signal is Fourier transformed. Then, the Fourier transformed signal originated from the photodetector inside the slave device is converted to complex conjugate. Both values are then multiplied together and inverse Fourier transformed. Next, quadratic fitting is performed in the vicinity of an index that gives the maximum value, and then the index that gives the maximum value is obtained not in an integer but in a real number. A value ($\zeta$) obtained by multiplying the obtained real number by $2\pi/1024$ is the phase difference in (Expression 7). The same operation is performed for the modulation frequency of 15 MHz to find $\zeta_1$, and the distance is obtained using (Expression 7) and (Expression 8). There is the following problem pertaining to practical use. The amount of light detected by the light receiving port in the forward face is so much smaller than the amount of light received by the photodetector inside, thus, the light received by the light receiving port has to be amplified by an amplifier. Since delay is caused by the amplifier, delay time ($t_D$) unrelated to the modulation frequency is caused in the signal $S_i$ relative to the signal $R_i$.

To correct this delay, the phase differences need to be corrected as follows.

$$\zeta \rightarrow \zeta - 2\pi t_D \times 20 \times 10^6 \quad \text{(Expression 11)}$$

$$\zeta_1 \rightarrow \zeta_1 - 2\pi t_D \times 15 \times 10^6 \quad \text{(Expression 12)}$$

The delay time depends on the individual amplifier incorporated in the slave devices. Thus, $t_D$ unique to each slave device needs to be obtained in advance through distance measurement for a known distance.

Example 4

In Example 4, there is only one slave device. As described earlier, a position locating instrument may be able to function as either a master device or a slave device, or as any of a master device, a reference device, and a slave device. A wavelength-changeable (wavelength-swept) light source may be incorporated in the reference device.

Figure 14:
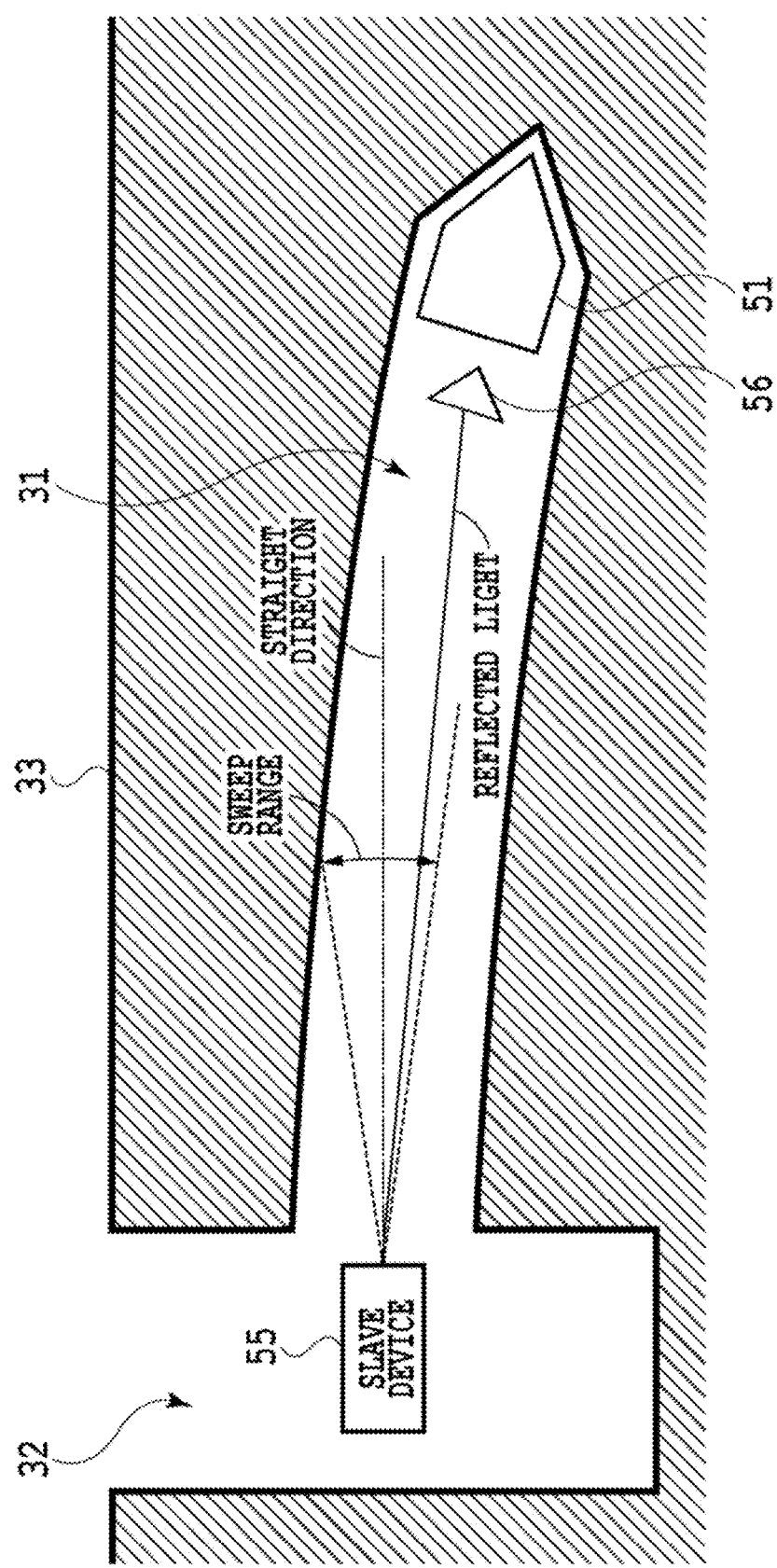
FIG. 14 is a diagram showing an example where there is only one position locating instrument.

FIG. 14 shows an example where there is only one position locating instrument. A single slave device 55 is placed in a shaft 32 outside a tunnel 31. This slave device 55 has its "forward face 21" shown in FIG. 4B facing the tunnel 31. A retroreflector 56 is placed behind an excavator 51 located at the head of the tunnel 31.

The travel direction of light emitted from the slave device oscillates within the angle shown as a "sweep range". When the retroreflector is within the sweep angle range, light travelling toward the retroreflector is reflected and returns to the slave device. Based on the time difference in the light angle sweep reciprocation, the wavelength and emission angle of the light at the position of the retroreflector are obtained using the method described with reference to FIG. 7. In the same way of Example 2, the distance from the slave device to the retroreflector can also be measured through intensity modulation on the output light.

The invention claimed is:

1. A position locating instrument comprising:
   at least one light emission port through which light from a wavelength-changeable light source is emitted; and
   at least one light receiving port that detects light emitted or reflected by an adjacent position locating instrument,
   wherein a wavelength of the wavelength-changeable light source is swept within a predetermined wavelength range in a predetermined cycle, and
   the light emitted from the light emission port has a fanlike pattern and has an emission angle varying, as a monotonic function of a wavelength of the light, in a direction perpendicular to a direction in which the light spreads in the fanlike pattern,
   wherein the position locating instrument detects light emitted by the adjacent position locating instrument, or detects light reflected by the adjacent position locating instrument, and then detects the wavelength of the detected light by measuring a time difference between two timings of detecting light of a predetermined wavelength in one cycle of the wavelength sweeping so that at least one of parameters for relative positional relation and attitude of the position locating instrument is measured.

2. The position locating instrument according to claim 1, wherein
   output light from the wavelength-changeable light source is light-power-modulated with a particular frequency, and
   a distance to the adjacent position locating instrument is obtained by
      detecting, as a reference signal, variation in the intensity of light before the light is emitted,
      detecting, as a reflection signal, variation in the intensity of light reflected by the adjacent position locating instrument including an optical reflection element, and
      obtaining a phase difference between the reference signal and the reflection signal for at least two frequencies.

3. The position locating instrument according to claim 1, wherein
   the adjacent position locating instrument is provided with at least two light receiving ports at different positions apart with a predetermined space in a direction in which the position locating instrument emitting light varies the emission angle, and
   a distance between the two position locating instruments is obtained by measuring a time difference between two timings of receiving light at each of the two light receiving ports.

4. The position locating instrument according claim 1, wherein
   the position locating instrument emits light from at least one of a forward face and a backward face thereof in at least two patterns of light emission angle variation, and
   directions of the light emission angle variation are orthogonal to each other.

5. The position locating instrument according to claim 1, further comprising the wavelength-changeable light source, wherein the position locating instrument receives light reflected by an optical reflection element provided to an excavator located at a head of a tunnel.

6. A position locating system comprising:
   a master device having a wavelength-changeable light source for emitting wavelength-changeable light to an optical fiber; and
   a plurality of position locating instruments connected to each other in series connection,
   wherein each position locating instrument is configured to receive the wavelength-changeable light via the optical fiber, split the wavelength-changeable light to emit part of the light through at least one light emission port, and pass the rest of the light to lower-side position locating instrument via an optical fiber, and includes at least one light receiving port that detects light emitted or reflected by an adjacent position locating instrument,
   the light emitted from the light emission port has a fanlike pattern and has an emission angle varying, as a monotonic function of a wavelength of the light, in a direction perpendicular to a direction in which the light spreads in the fanlike pattern, and
   a wavelength of light detected by the position locating instrument after being emitted by the adjacent position locating instrument, or a wavelength of light detected by the position locating instrument after being emitted by the position locating instrument and then reflected by the adjacent position locating instrument is obtained so that at least one of parameters for relative positional relation and attitude of the position locating instrument is measured.

* * * * *